United States Patent [19]

Grossman et al.

[11] Patent Number: 5,130,995
[45] Date of Patent: Jul. 14, 1992

[54] LASER WITH BREWSTER ANGLED-SURFACE Q-SWITCH ALIGNED CO-AXIALLY

[75] Inventors: William M. Grossman; Richard W. Wallace, both of Los Altos, and Leonard Pearson, Sunnyvale, all of Calif.

[73] Assignee: Lightwave Electronics Corp., Mountain View, Calif.

[21] Appl. No.: 343,114

[22] Filed: Apr. 25, 1989

[51] Int. Cl.⁵ .................................. H01S 3/11
[52] U.S. Cl. ................................. 372/13; 372/92; 372/107; 372/108
[58] Field of Search .................. 372/18, 12, 13, 107, 372/92, 108

[56] References Cited

U.S. PATENT DOCUMENTS

| | | | |
|---|---|---|---|
| 3,564,450 | 2/1971 | Immarco et al. | 372/12 |
| 3,866,141 | 2/1975 | Milam et al. | 372/18 |
| 3,959,740 | 5/1976 | De Whirs | 372/12 |
| 3,982,203 | 9/1976 | de Wit | 372/13 |
| 4,736,378 | 4/1988 | Myslinski | 372/13 |

*Primary Examiner*—Leon Scott, Jr.
*Attorney, Agent, or Firm*—J. Eppa Hite, III

[57] ABSTRACT

A miniature laser cavity in which a solid-state lasing gain element and a Q-switch have respective end surfaces at substantially the Brewster angle, parallel to and facing each other, and separated by a narrow gap occupied by a transparent low-index-of-refraction material.

19 Claims, 4 Drawing Sheets

LASER WITH BREWSTER ANGLED-SURFACE Q-SWITCH ALIGNED CO-AXIALLY

This invention was made with U.S. government support under contract DNA001-86C-0239 awarded by the Defense Nuclear Agency. The government has certain rights in this invention.

BACKGROUND

1. Field of the Invention

The present invention relates generally to lasers, and more particularly to diode-pumped Q-switched miniature lasers.

2. Prior Art

Basic theories of pulsed mode laser operation were introduced by W. G. Wagner and B. A. Lengyel in "Evolution of the Giant Pulse in a Laser," *Journal of Applied Physics* vol. 34 No. 7 pp. 2040–2045 (1963). U.S. Pat. No. 3,613,024 by Geusic describes a solid-state Nd:YAIG laser cavity in which, to build up pulses, the internal beam resonance is interrupted temporarily by action of an acousto-optic Q-switch. The Q-switch has normal-incidence surfaces with anti-reflection coatings to reduce optical losses. Laser cavities can be pulsed efficiently by Q-switches using acoustic waves.

Figure 1:
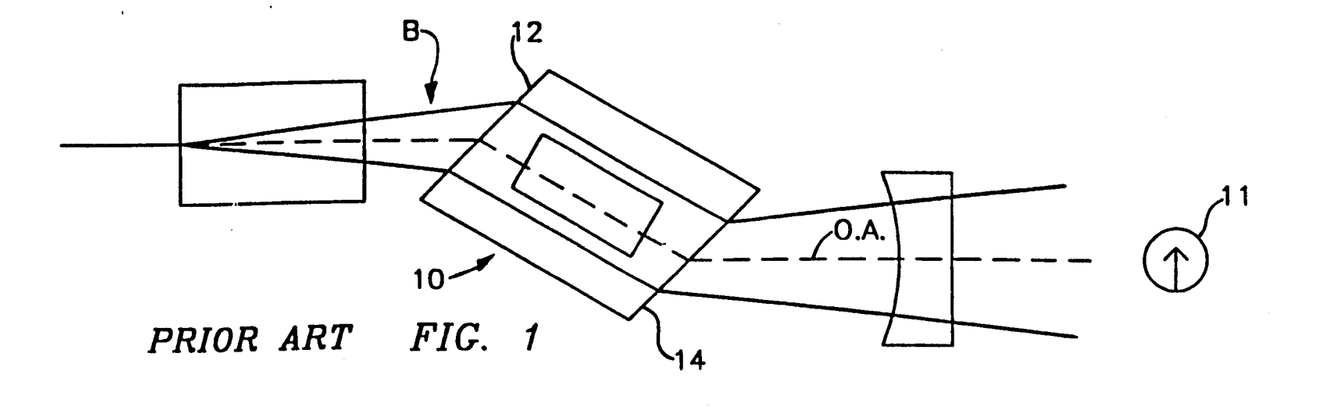
FIG. 1 is a top view of an internal beam in a conventional Brewster-angled Q-switch.

Lasers in many applications require operation with polarized light. Some solid-state crystalline laser gain materials inherently promote polarized light operation. Other conventional solid-state laser cavities as shown in FIG. 1 are polarized by passing light in beam B along optical axis OA through an acousto-optic Q-switch 10 having Brewster-angled surfaces 12 and 14. The Brewster-angled surfaces polarize light without exacting losses in one dimension of beam B as indicated by arrow 11 in the plane of FIG. 1. Optics which minimize reflection losses by Brewster-angled surfaces are generally more durable and less expensive than the alternative way of reducing reflection losses by using anti-reflection coatings.

Exploitation of Q-switches 10 having Brewster-angled surfaces 12, 14 is complicated, however, by the fact that upon penetrating surfaces non-normally, such as Brewster angled surfaces of Q-switches, light rays in diverging beams encounter effectively different path lengths in the sagittal and tangential planes. Different path lengths cause astigmatism in divergent beams, i.e. beam shapes become aberrated. This typically reduces laser energy extraction efficiency and power output. Various effects on resonant modes of cavities with non-normal incidence optical elements were analyzed by H. Kogelnick and T. Li in "Laser Beams and Resonators," *Proceedings of the IEEE* vol. 54 pp. 1312–1329 (Oct. 1966), and further by G. A. Massey and A. E. Siegman in "Reflection and Refraction of Gaussian Beams at Tilted Ellipsoidal Surfaces," *Applied Optics* vol. 8 pp. 975–978 (1969).

Brewster-angled surface-induced astigmatism increases both with beam divergence and path length in traversing obliquely-intercepted media. Aberrations are worse for beams either diverging more widely and/or traveling longer distances through an oblique Q-switch. Conversely, aberrations are less severe for beams diverging less widely or traveling shorter distances. In a relatively large, continuously lamp-pumped one-meter long Nd:YAG laser cavity apertured for the 1.064 um wavelength lasing in the TEM$_{00}$ mode, internal beams usually have thick (1 mm) diameter waists and correspondingly narrow (e.g., 1.4 milliradian) far-field divergences. Such a narrow divergence beam is only negligibly aberrated by traversing a 5 cm long Brewster-angled Q-switch 10, and emerges with less than 1% circular distortion, permitting the laser to run essentially diffraction-limited.

Contrastingly, in small cavities pumped by laser diodes, internal Gaussian beams commonly have smaller 100 to 300 micron diameter waists along with broader 5 to 15 milliradian far-field divergences. L.J. Rosenkrantz describes a laser with a diode end-pumping an Nd:YAG gain medium in "GaAs Diode-Pumped Nd:YAG Laser," *J. App. Phys.* vol. 43 No. 11 pp. 4603–4605 (Nov. 1972). K. Iwamoto, I. Hino, S. Matsumoto and K. Inoue report extended area diodes used for end-pumping cavities in "Room Temperature CW Operated Superluminescent Diodes for Optical Pumping of Nd:YAG Laser," *Japanese Journal of Applied Physics* vol. 15 No. 11 pp. 2191–2194 (Nov. 1976).

Lasers combining diode-pumping with Q-switching were proposed by M. Ross in "YAG Laser Operation by Semiconductor Laser Pumping," *Proceedings of the IEEE* pp. 196–197 (Feb. 1968). Later demonstrations were reported by G.M. Zverev, I.I. Kuratev, and A.V. Shestakov in "Solid State Microlasers Based on Crystals with a High Concentration of Neodymium Ions," *Bulletin of the Academy of the Sciences of the USSR, Physical Sciences*, vol. 46 No. 8 pp. 1561–1566, English trans. pp. 108–112 (1982) Early diode-pumped Q-switched solid-state laser reports are summarized by I. I. Kuratev in "Solid State Lasers with Semiconductor Pumping," *Bulletin of the Academy of the Sciences of the USSR, Physical Sciences*, vol. 48 No. 8 pp. 1564–1572, English trans. pp. 104–112 (1984).

In relatively small cavities, astigmatism induced by a Brewster-angled Q-switch 10 can diminish output power by as much as half. With a Brewster-angled Q-switch 10 which is 5 cm long, a near-concentric cavity must be less than 10 cm long to form a small (100 to 300 um) diameter mode volume. Near-confocal cavities are less sensitive to astigmatism influences from optical interfaces at Brewster angles.

Figure 2:
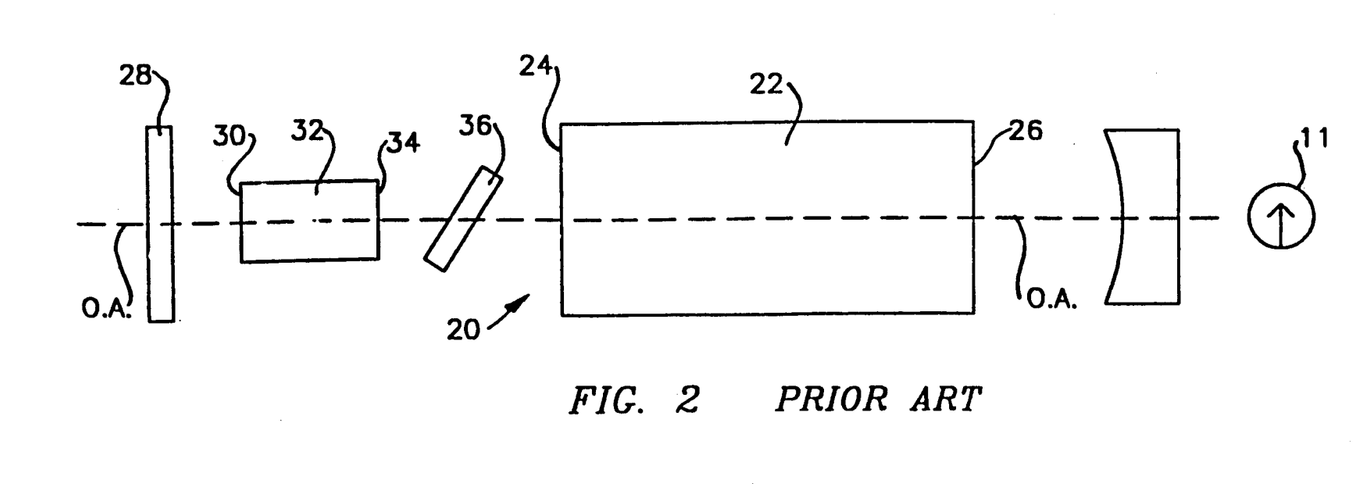
FIG. 2 is a top view of a conventional miniature laser cavity polarized by a thin Brewster-angled plate.

Miniature diode-pumped Q-switched laser cavities 20 as shown in FIG. 2 conventionally use acousto-optic Q-switches 22 with normal-incidence opposite end surfaces 24 and 26. A laser diode (not shown) pumps light from the left in a beam along optical axis OA, which enters through a back mirror into cavity 20. A back mirror may be either an optional separate element 28 or a coating 30 on the end surface of gain material 32. In either case, light entering along axis OA traverses gain material 32 and emerges from normal incidence surface 34. Light along axis OA next penetrates Brewster angled polarizing plate 36, which is typically so thin (0.5 to 1.0 mm) that it induces only negligible aberrations in beam B. Brewster plates 36 are suitably made from materials such as industry standard fused silica. To avoid output beam aberrations which could be caused by use of astigmatic optical elements, FIG. 2 type miniature lasers have previously refrained from incorporating FIG. 1 type Brewster-angled surface Q-switches 10.

G.T. Maker and A.I. Ferguson disclose a polarizing structure with a gain material having one Brewster-angled surface, but which has coatings on various surfaces, in "Mode Locking and Q-Switching of a Diode Laser Pumped Neodymium Doped Yttrium Lithium Fluoride Laser," *Applied Physics Letters* vol. 54 No. 5 pp. 403–405 (1989).

Diode-pumped Q-switched miniature lasers remain in need of ways to polarize cavities without incurring aberrations or output power losses.

SUMMARY OF THE INVENTION

It is therefore an object of the present invention to provide polarizing geometries for Q-switched lasers which are advantageous for diode pumping, have very low internal losses, and are scalable to miniature sizes.

Conventional polarizing Brewster plates are foregone by this invention, which instead polarizes diode pumped Q-switched miniature laser cavities by using sets of Brewster-angled surfaces parallel-spaced across narrow gaps filled with air. Laser light resonating in the cavity beam is linearly polarized by passing through the Brewster-angled surfaces, yet remains nearly free of optical aberration or losses, thanks to the short length of the air space between two Brewster surfaces where the refractive index is almost one. Brewster-angled surfaces are preferably provided on the laser gain material, the Q-switch, and the end mirrors.

DETAILED DESCRIPTION OF THE PREFERRED EMBODIMENT

The present invention is preferably embodied in polarizing laser cavities for end-pumping, but may also be embodied in cavities for side-pumping. Light energy pumped from wider (>1 mm) diodes or from diode arrays can be coupled into the TEM$_{00}$ or into other low order modes for conversion into laser output power relatively efficiently by side-pumping. Light energy pumped from less wide (<1 mm) diodes can be coupled into the TEM$_{00}$ mode for conversion into laser output power more efficiently by end-pumping.

Figures 3A, 3B:
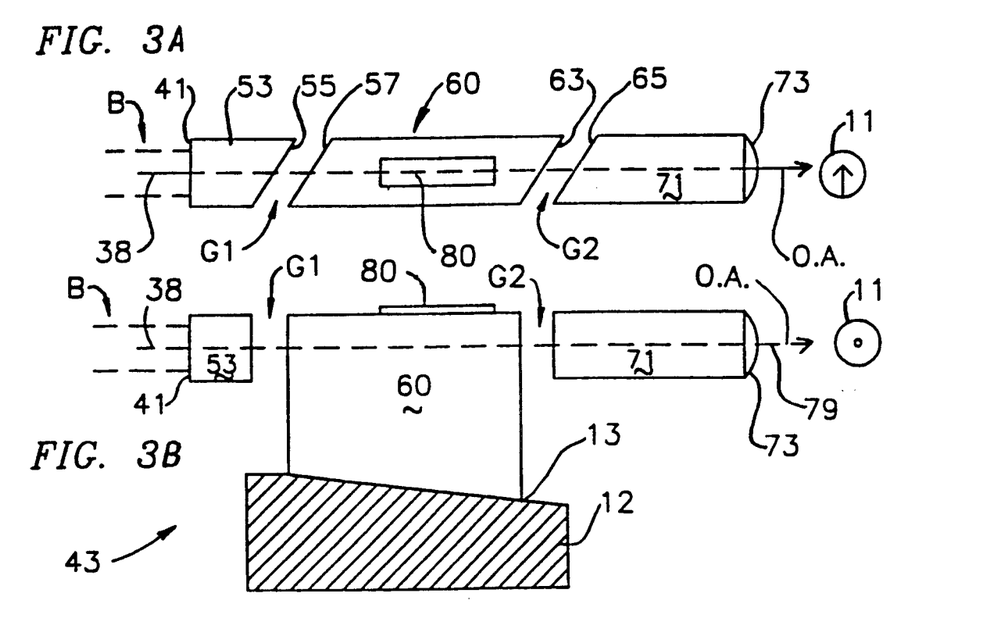
FIGS. 3A and 3B show the invention embodied in a cavity with a curved output-coupling mirror.
Figure 4A:
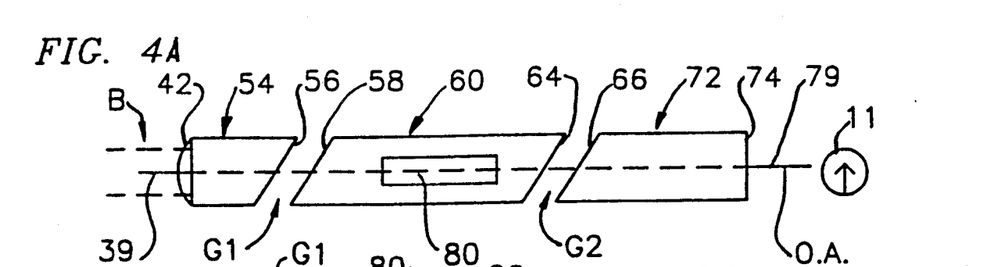
FIGS. 4A and 4B show the invention embodied in a cavity with a curved back-mirror.
Figure 4B:
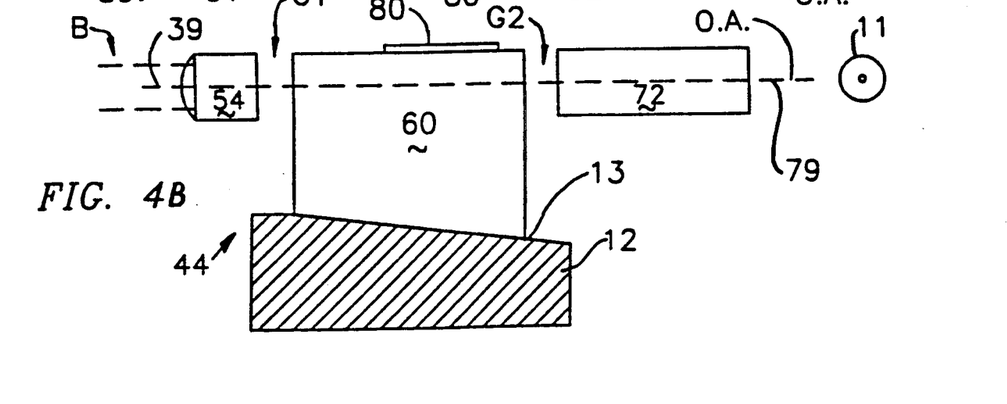

The geometry of the present invention is shown in FIGS. 3 and 4 in alternate embodiment cavities 43 and 44. Laser diodes, not shown on the left, pump light beams B along respective optical axes 38 and 39 through back-mirror coatings 41 and 42 into cavities 43 and 44. Back-mirror coatings 41 and 42 are highly (typically T>90%) transmissive to wavelengths of light pumped from their laser diodes, while being highly (typically R>99.9%) reflective to wavelengths of internally resonating light. Gallium aluminum arsenide laser diode pumps lase at a wavelength near 0.8 micrometers corresponding to pump light absorption bands of such significant laser gain materials 53 or 54 as neodymium-doped yttrium aluminum garnet (Nd:YAG) and neodymium-doped yttrium lithium fluoride (Nd:YLF).

Diode pump light beam axis OA traverses laser gain material 53, 54 to opposite end surface 55,56 from which it emerges at the Brewster angle. Axis OA then crosses a first narrow gap G1 filled with air, and penetrates a second Brewster-angled surface 57,58 into an acousto-optic Q-switch 60. Inside Q-switch 60, axis OA advances at a characteristic Bragg angle $\theta$ (where tan $\theta$ = lambda/2$\Delta$, where lambda is the optical wavelength and $\Delta$ is the acoustic wavelength in the laser gain material). The Bragg angle is measured from perpendicular to the direction of acoustic waves propagated through Q-switch 60 by an acousto-optic transducer 80, as discussed below. From Q-switch 60 axis OA exits through a third Brewster-angled surface 63,64 into a second narrow gap G2 also filled with air. Across gap G2, axis OA penetrates fourth Brewster angled surface 65, 66 into out-coupling end mirror 71 or 72. FIGS. 3T and 3S end mirror 71 has an inwardly concave mirrored surface 73, whereas FIG. 4 end mirror 72 has a flat surface 74. Both end surfaces are preferably coated with partially transmissive mirrors which pass a predetermined fraction of the cavity light along laser output beam axis 79.

The FIG. 3 and FIG. 4 cavity 43 and 44 geometries differ in their curved mirror surface orientations. FIG. 3T and 3S output coupling mirror 71 curvature 73 concentrates cavity power to the highest density inside gain material 53 by focusing the beam to a waist at back mirror 41 on the flat end surface of gain material 53. Contrarily, FIG. 4 curved back mirror 42 focuses its beam waist at output coupling mirror on flat end surface 74.

The same gain materials 53,54 produce given diameter modes in FIG. 4 geometry cavities with a back-mirror 42 having a short radius of curvature, and in FIG. 3 geometry cavities with output-coupling mirror 73 having a longer radius of curvature. In the geometries of FIGS. 3 and 4 for example both using Nd:YLF gain materials 53, 54 and fused silica Q-switches 60 and output-coupling mirror substrates 71, 72, equivalent 104 micrometer radius TEM$_{00}$ modes in the gain materials will be produced by either a FIG. 3 output coupler mirror 73 with a 122 mm radius-of-curvature or by a FIG. 4 back-mirror 42 with a 65 mm radius-of-curvature.

While pumped by a one-watt diode, for example a Sony model 304X, a Nd:YLF laser being switched by a fused silica Q-switch 60 requires a radio frequency (RF) drive power of 2 to 4 watts at an especially high frequency as explained below. RF drive power is partially dissipated as heat within a laser cavity, which consequently tends to suffer distortion and misalignment. Heating is preferably minimized by limiting use of RF power in Q-switches 60. RF drive powers over 10 watts in Q-switches typically require active external cooling such as by flowing water. Laser cavities 43 and 44 have angular alignment sensitivities which vary approximately linearly with variations in the lengths of the radii of their respective curved mirrors. Since given diameter modes are formed by shorter radius of curvature back-mirrors 42, the FIG. 4 geometry sensitivity to misalignment is less, by about half, than the longer-radius geometry of FIGS. 3. Since temperature changes have less influence on their alignments, FIG. 4 geometry cavities 44 function more consistently between continuous and pulsed mode operations.

When using gain materials 53, 54 having equal diameter modes with equal extraction efficiencies, FIG. 4 geometry cavities 44 form beams of smaller diameter inside Q-switch 60, which allows faster switching than in FIG. 3 cavities 43. FIG. 4 cavities 44 focus higher power densities at partially transmissive output-coupler mirror surface 74 than FIG. 3 cavities 43 focus at output-coupler mirror surface 73, so FIG. 4 geometry cavities are more liable to incur optical damage. Still, both the FIG. 3 and FIG. 4 designs can limit their risk of optical damage through use of high quality coatings and proper output transmission. Typical output-coupling mirror coatings 73, 74 transmit 10% to 15% of the light at 1.064 or 1.047 um wavelengths lasing in Nd:YAG or Nd:YLF gain materials being pumped by one-watt laser diodes. The FIG. 4 geometry is preferred for pumping beams from one-watt, 200 micrometer long diodes Higher output transmission percentages are appropriate for higher pumping powers. Conversely, lower output transmission percentages are appropriate for lower pumping powers, lower gain lasing materials, or lower gain laser lines.

The FIG. 3 geometry is potentially advantageous for being pumped by diode stripes shorter than around 100 um. In particular applications, cavities having both end mirrors curved (not shown) are potentially advantageous in balancing and thereby reducing peak powers and risks of optical damage to the mirror coatings.

Matching Indices-of-Refraction

In the FIG. 3 or FIG. 4 geometries, laser gain media 53, 54, Q-switches 60 and output coupling end mirror substrates 71, 72 are preferably embodied in materials having the most nearly possibly matching indices of refraction. Matched indices of refraction equalize Brewster angles in cavity elements, which orients the laser cavity's OA parallel in each optical element. This reduces astigmatism and simplifies laser cavity construction.

A preferred first example of a set of matched-index-of-refraction materials includes fused silica for Q-switches 60 and for out-coupling end mirrors 73, 74, along with Nd:YLF crystal for solid-state gain media 53, 54. Nd:YLF crystal and fused silica have essentially equal 1.45 indices of refraction.

Also available for Q-switches are SF10 glass, LiNbO3 and TeO2, which all have diffraction efficiencies substantially (2 to 25 times) higher than does fused silica. When cavity round-trip gains are moderate in miniature diode pumped lasers (10% to 70%), it is not evident whether fused silica Q-switches would be advantageous. U.S. Pat. No. 4,761,786 by Baer, which shows diode-pumped lasers using Q-switches formed of TeO2, SF10 glass or LiNbO3, teaches "[in order to build a small Q-switch, non-standard materials must be used" (col. 3 line 65). Baer further declares that "any material with an acoustic-optic figure of merit substantially greater than fused silica could be used" (col. 4 line 8, emphasis added).

Despite this recommendation that miniature laser Q-switches be formed only of very high figure of merit materials, fused silica, if used efficiently, can satisfactorily implement Q-switches 60 in miniature lasers. In order for a miniature Q-switches' potential diffraction efficiency to be fully utilized, appropriately higher, for example 108 MHz, RF drives are preferably used rather than the more usual 27 MHz RF drives. Acousto-optic Q-switches 60 deflect light at angles approximately proportional to the frequencies of the acoustic waves imparted to them. Acoustic frequencies which are too low deflect light only by angles inadequate to switch beams out of the cavity, and necessitate more powerful RF drives. In a Nd:YLF laser cavity 50 mm long lasing at the 1.047 um wavelength, Q-switch acoustic frequencies must exceed 50 MHz to deflect an 0.2 mm diameter beam out of the mode volume far enough to efficiently switch the laser. Shorter length cavities require higher frequencies for acousto-optic transducers to deflect beams from their mode volumes. In a 22 mm long FIG. 3 or FIG. 4 type cavity, or a in shorter still 15 mm long FIG. 7 type cavity with a 10 mm long acousto-optic Q-switch 60, 70, acoustic frequencies preferably exceed 100 MHz. A 22 mm long laser, after a 20 to 25 nanosecond buildup interval for a 0.2 mm diameter beam, can be switched within 20 nanoseconds to produce 3 to 5 nanosecond-duration pulses.

If positioned sufficiently close (within 1 mm) to axis OA, a narrow (preferably 0.3 mm by 5 mm) piezo electric transducer 80 directs its acoustic power, before it diverges and is attenuated, into interaction with resonating optical beams. Transducers 80 more than twice 0.3 mm wide are likely to compromise diffraction efficiency with Gaussian beams 0.2 mm in diameter.

Typically, using nominally one watt diodes, 0.8 to 0.9 watts of pumped light is collected by 0.5 NA objective imaging lenses (not shown) pumping FIG. 4 laser cavities 44 including a Nd:YLF crystal gain medium 54, and a fused silica Q-switch 60 and out-coupling mirror substrate 72. An Nd:YLF crystal gain medium exhibits 1.047 um round-trip gains of around 45%, and produces CW output power of 0.3 watts. Such lasers produce, at low repetition rates, pulses lasting 3 to 5 nanoseconds (full width at half maximum intensity) with energies between 60 and 75 microjoules.

With short pulses (3 to 10 ns , some lasers lose pulse energy because lower level laser energy bottlenecks leave unused population in the upper level. This is discussed by T.Y. Fan in "Effects of Finite Lower Level Lifetime on Q-Switched Lasers , IEEE Journal of Quantum Electronics vol. 24 No. 12 pp. 45–48 (Dec. 1988). In Nd:YLF lasers, particularly under some conditions, this lower-level effect causes small after-pulses. After-pulses may be avoided by applying RF drive to the Q-switch before the second pulses have time to arise, theoretically resulting in little or no change in the laser power.

A second example of a set of matched index of refraction laser cavity components is titanium doped sapphire and SF10 glass, which have comparable refraction indices between 1.70 and 1.75.

A third example of a set of matched index-of-refraction laser gain medium and acousto-optic Q-switch materials is Nd:YAG and SF6 glass, which have comparable refractive indices of about 1.82.

Figure 5:
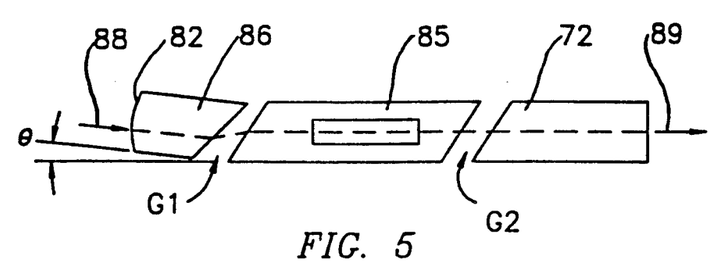
FIG. 5 shows the geometry of FIGS. 4 embodied in somewhat mismatched materials.

SF6 glass has a refractive index almost exactly equal to that of Nd:YAG, but SF6 glass is prone to staining, which objectionably increases optical losses. In compromise, the FIG. 4 geometry in other embodiments uses only approximately matching index of refraction materials. SF10's 1.72 refractive index corresponds only approximately to the Nd:YAG crystal 1.82 index of refraction, but in compensation SF10 glass is impervious to staining and has good optical transmission and acousto-optic qualities. Hence, the FIG. 5 embodiment uses SF10 glass to form both Q-switch 85 and flat end mirror 72. In gap G1 between SF10 Q-switch 85 and Nd:YAG gain medium 86, the section of optical axis OA is deviated from being parallel to the section of axis OA in Nd:YAG gain material 86, as well as to axis OA in SF10 Q-switch 85. Axis OA is bent in gap G1 by an angle $\phi$ equalling twice the difference between the Brewster angles of optically mis-matched SF10 Q-switch 85 and Nd:YAG gain material 86, i.e. by about 3 degrees. This deviation may be compensated through correspondingly deviating pumping beam axis 88 by 3 degrees from cavity beam output axis 89. This compensation restores the internally bent beam to optimally overlap the mode volume of gain material 86. When pumped by a collected power of 0.8 watts, a FIG. 5 Nd:YAG laser cavity with a 65 mm radius of curvature back-mirror 82 typically outputs CW power of 0.25 watts or 50 microjoule pulses of 5 nanosecond duration Nd:YAG crystals with larger (158 mm) radius of curvature surfaces better tolerate misalignments while continuing to control performance losses in the $TEM_{00}$ mode.

Polarization Angle

Figure 6A:
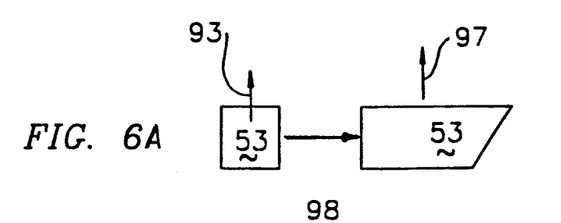
FIG. 6A, 6B, 6C and 6D show polarizing orientations for a laser gain crystal.
Figure 6B:
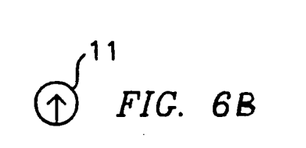

The FIG. 3 laser gain material 53 shape is reproduced as viewed from the end, top, side and bottom in FIGS. 6E, 6T, 6S and 6B for two orientations of the crystal optical axis. Nd:YLF crystal gain material 53 is birefringent, and preferentially absorbs and lases with light polarized parallel to its C-crystalline axis. Hence, Nd:YLF does not generally need polarization, by Brewster surfaces for example. For optimal power at the 1.047 micrometer wavelength, the C-axis 93 (the same as axis 97) is oriented in the plane of FIG. 6E within a tolerance of ±1 degree of parallel to polarization direction axis 11 determined by Brewster surface 55. In the plane of FIG. 6T, tilting rotation of C axis 97 only affects the absorption of diode pump light, not the birefringence apparent to the laser light. Therefore, the C axis 97 orientation tolerance is relaxed to ±4 degrees. C-axis 97 tolerances relaxed even to ±15 degrees still achieve over 98% of optimal absorption.

Figure 6C:
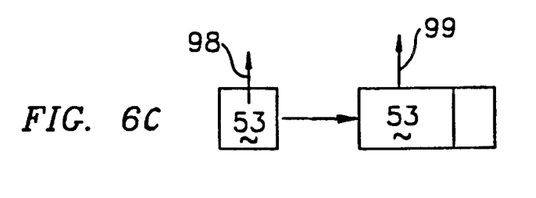
Figure 6D:
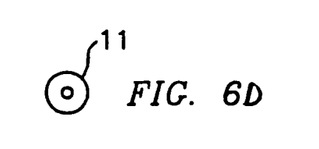

FIGS. 6S and 6B illustrate C-axis optimal orientation 98, 99 for lasing at the 1.053 micrometer wavelength. In the plane of FIG. 6S, C-axis 98 should be within a ±1 degree tolerance of perpendicular to optical axis OA. In the plane of FIG. 6B, C-axis 99 should be within a ±15 degree tolerance of perpendicular to the light polarization direction 11. Compared to 1.047 micrometer lasing, 1.053 micrometer CW and pulse lasing powers are reduced by about a third while pulse duration is increased by about half.

The FIG. 3 and 4 cavity geometries can also be embodied for other wavelengths of laser light. For example, Nd:YLF and Nd:YAG lasers with suitable coatings can suppress the one micrometer range laser gain lines to instead operate at lower 1.3 micrometer gain lines.

Scale

The FIG. 3 and FIG. 4 cavity geometries in preferred embodiments have optical axis OA path lengths of 5 mm through laser gain materials 53, 54; 10 mm through Q-switches 60; and 5 mm through nd mirror substrates 71, 72. Axis OA crosses first and second gaps G1 and G2 occupied by air between opposing pairs of surfaces 55–57 (or 56–58) and 63–65 (or 64–66) at the Brewster angle. Measured normal to facing Brewster-angled surfaces, air gap G1 and G2 spacings are about 1 mm. The total cavity 43 or 44 length is about 22 mm. Air gap G1 and G2 widths up to several mm wide, or down to surfaces almost touching, should not induce aberrations severe enough to constrain the output mode quality of near confocal solid-state lasers.

To utilize recently available wider aperture laser diode pumps requires laser cavities with expanded $TEM_{00}$ mode volumes. The reasons are: first to limit cavity gains comensurate to the diffractive loss efficiency capability of the acouto-optic Q-switches, and second to assure that $TEM_{00}$ mode volumes are large enough to efficiently extract pump light energy and to forestall lasing in higher order modes. In typical near-confocal laser cavities bounded between flat and curved mirrors, $TEM_{00}$ mode volumes increase with approximately the fourth root of increases in mirror curvature radii, if the cavity length remains fixed. $TEM_{00}$ mode volumes increase more rapidly with increases in cavity lengths. Increasing cavity lengths increases cavity round-trip times, which extends pulse build-up times and durations. Alternately, with higher power diode pumping, increasing cavity lengths can help maintain pulse build-up times and durations. Otherwise, pulse lengths decrease as power increases, which is usually desirable, unless the acousto-optic Q-switching speed is almost, or already, limiting the laser performance.

The FIG. 3 and FIG. 4 cavity geometries are scalable upwards to lengths as long as 20 cm for decreased gain, increased pulse duration, or possibly increased pumping energies. Scaled-longer transmissive parts need proportionately better quality, lower strain-induced birefringence optical materials. Longer 150 to 175 mm radius of curvature cavities typically widen mode margins, but yield 20% longer pulses having 10% less energy.

Conversely, the FIG. 3 and FIG. 4 cavity geometries are scalable downward to lengths as short as 1 cm for reduced pulse durations, without reduced energies, as long as Q-switches 60 are able to open before imposing losses on the laser. Shorter radius-of-curvature cavities are potentially more useful for longer wavelength laser operations.

Figure 7:
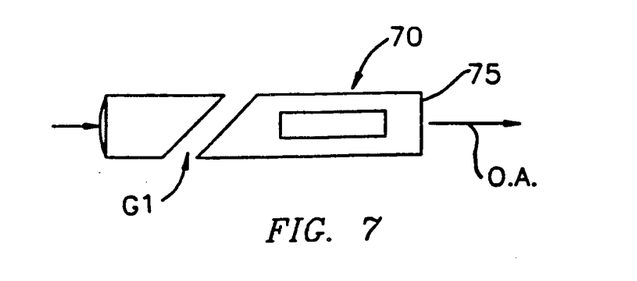
FIG. 7 shows the invention in an alternate embodiment with one-piece Q-switch/end mirror using only one pair of Brewster surfaces.
Figure 8:
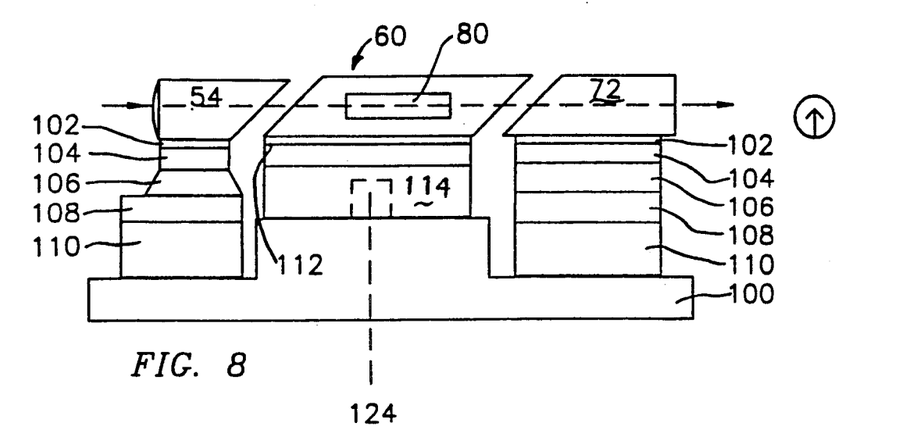
FIG. 8 shows mounting supports for the preferred FIG. 4A and 4B embodiment.

FIG. 3 and FIG. 4 cavity surfaces are preferably fabricated with ±1 degree tolerances. The output-coupling back-end mirrors 71,72 being fabricated separately eases tolerances. However, these cavity geometries could be modified to more economically use one part to perform both the functions of Q-switch 60 and partially transmissive end mirror 71, 72, or to perform both the functions of laser gain material 53, 54 and Q-switch 60. In the FIG. 4 cavity design partially transmissive output-coupling mirror on flat surface 75 could be fabricated as part of a Q-switch 70 as shown in FIG. 7. In contrast, the Kuvatev (1984) laser cavity combines an end mirror with a Q-switch, but is not polarized. One internal Brewster-angled air gap G1 is retained for polarization. Single Brewster-angled medium diode-pumped Q-switched lasers of the type shown in FIG. 7 typically have acousto-optic modulator Bragg-angle tolerances of around ± three minutes. This presently decreases the practicality of FIG. 7 geometry cavity fabrication versus FIG. 3 or FIG. 4 geometry cavities Assembly The FIG. 4 optical resonator gain material 54, Q-switch 60 and out-coupling mirror 72 are preferably mounted on a common base heat sink 100 as shown in FIG. 8. Bonding materials are not applied to optical apertures. Laser gain material 54 and partially transmissive out-coupling mirror 72, for better soldering, may be metal coated or are preferably glued, using ultra violet (UV) light curable cement 102, to part carriers 104. Carriers 104 are made of copper, preferably with a stable gold plating, which, though not necessary, enhances adhesion by solder. Part carriers 104 are then solder 106 bonded to metalized heater pads 108. Solder 106 is melted by film resistors (not shown) formed on surfaces of pads 108. Heater pads rest on insulators 110 to avoid directly contacting common base heat sink 100. In alternative embodiments, solder 106 could be heated by external means. Tilt and positional degrees of freedom are provided by the easily reflowable solder, without needing mechanical mounts. Laser material 54 and end mirror 72 are precision oriented in the melted solder, which is then allowed to cool to fix their positions.

Typically, acousto-optic Q-switch material 60 is bonded by high acoustic-impedance glue 112 to an acoustic absorber-carrier 114, in which received sound waves are dissipated as heat. Carrier 114 is in turn fastened to common base heat-sink 100.

Figure 9A:
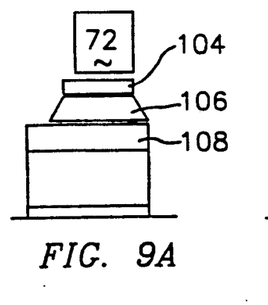
FIGS. 9A, 9B and 9C show alternate mounting supports.
Figure 9B:
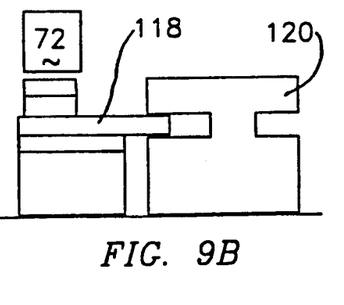
Figure 9C:
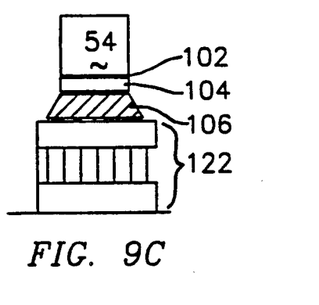

The FIG. 8 mounting geometry may be implemented alternately either as shown in FIG. 9A and 9B or as shown in FIG. 9C, which mount laser material 54 differently. In FIG. 9B, on top of heater pad 108, high melting-temperature silver solder 116 is used to bond an intermediate copper shim 118 protruding beyond the profile of laser material 54. Next, for precision-alignment, a low melting-temperature indium solder 106 is used to bond carrier 104 onto shim 118. After the step of low temperature soldering has been completed, shim 118 is preferably grasped by a large clamp 120, which sinks heat from pump-beam heated laser material 54.

Rather than using insulator 110 and heater pad 108, the mounting of FIG. 9C uses a thermo-electric cooler/heater 122 to melt solder 106, and optionally later to control the temperature of laser material 54. A thermistor or other type of temperature sensor, not shown, can be used to complete a temperature control loop.

It is useful to be able to reproducibly position beam outputs from lasers during construction. In penetrating Brewster-angled surface-interfaces with air gaps G1 and G2, optical axis OA is deviated by an angle equal to twice the characteristic Brewster angle, minus 90 degrees, i.e. for fused silica parts about 21 degrees. Referring to FIG. 4T, the sizes of air gaps G1 and G2 therefore dictate lateral displacements of the beam. The Q-switch 60 spacing by gap G2 from end-mirror 72 can be adjusted to shift the beam axis OA in one (illustrated as vertical) dimension. End mirror 72 being shifted rightward shifts beam axis 79 upward. The beam may be positioned in the (illustrated) horizontal dimension by horizontally moving FIG. 4 or FIG. 8 Q-switch 60 with its mounting structure 114. The air gap G1 width between laser material 54 and Q-switch 60 is set for the optical beam to intersect the acoustic beam. This leaves only the air gap G2 spacing between Q-switch 60 and end mirror 72 available for use in directing the output beam axis 79.

The laser output beam direction is preferably reproducibly aligned during manufacture. In the FIGS. 4 design, output coupling mirror 72 flat surface 74 is advantageously necessarily normal to the orientation of the beam output from each laser. This allows the laser beam output direction to be calibrated by using another laser to reflect an auxiliary beam off flat mirror 74 and adjusting its reflection angle to a precise standard. During manufacture, FIGS. 4 Q-switch 60 can be tilted around FIG. 8 axis 124 to precisely set its Bragg angle without danger of disturbing the position of optical axis OA in laser gain material 54, which must itself remain fixed in order to coincide with the diode pump beam axis 39.

While the present invention has been described in terms of preferred embodiments, it will be appreciated by those skilled in the art that these embodiments may be modified without departing from the essence of the invention. It is therefore intended that the following claims be interpreted as covering any modifications falling within the true spirit and scope of the invention.

We claim:

1. A laser means comprising:
    an optical resonator cavity formed by a front mirror element and an opposing back mirror element which define between them an optical axis having a specified length, at least one of said mirror elements having a curvature, around said optical axis, concave towards the other one of said mirror elements;
    a solid-state lasing gain element disposed inside said cavity and having
    a longitudinal centerline parallel to the optical axis through a first one of said mirror elements,
    a longitudinally outer end adjacent said first mirror element, and
    a longitudinally opposite inner end with a planar surface which is at its Brewster angle from an axis normal to said gain element centerline; and
    an acousto-optic Q-switch disposed inside said cavity and having
    a longitudinal centerline parallel to the optical axis through the second one of said mirror elements,
    a longitudinally outer end adjacent said second mirror element, and
    a longitudinally opposite inner end with a planar surface which is at its Brewster angle from an axis normal to said Q-switch centerline and is substantially parallel to said inner end surface of said gain element;
    said two inner end surfaces being separated by a first gap having a length, measured normal to said surfaces, not exceeding one-fourth of said specified length of said optical axis, whereby said cavity minimizes astigmatism.

2. A laser means as recited in claim 1 wherein said second mirror element comprises a separate substrate which has an outer side coated with a partially reflective dielectric and has an inner side with a planar surface which is at the Brewster angle from an axis normal to said optical axis through said substrate, and wherein said Q-switch has on its outer end a planar surface which is at the Brewster angle from an axis normal to said Q-switch centerline and is parallel to said inner side surface of said second mirror element;
    said outer end surface of said Q-switch and said inner side surface of said second mirror element being separated by a second gap, said first and second gaps having lengths, measured normal to respective pairs of said surfaces, in total not exceeding one-fourth of said optical axis length.

3. A laser means as recited in claim 1 wherein said gap is occupied by a transparent gas.

4. A laser means as recited in claim 1 wherein said Brewster-angles of said gain element and Q-switch surfaces are equal to within a tolerance of 0.6 degrees.

5. A laser means as recited in claim 4 wherein said gain element comprises titanium-doped sapphire and said Q-switch comprises SF10 glass.

6. A laser means as recited in claim 4 wherein said gain element comprises Nd:YAG and said Q-switch comprises SF6 glass.

7. A laser means as recited in claim 4 wherein said gain element comprises Nd:YLF and said O-switch comprises fused silica.

8. A laser means as recited in claim 4 wherein said gain element comprise Nd:YAG and said O-switch comprises SF10 glass.

9. A laser means as recited in claim 7 wherein said Q-switch comprises a piezo-electric transducer and drive means for applying acoustic waves at radio frequencies in excess of 50 megahertz in a direction at the Bragg angle from perpendicular to said centerline of said Q-switch.

10. A laser cavity comprising: a solid-state laser gain material, a back-mirror element, an acousto-optic Q-switch material, and an end mirror material with a partially-transmissive coating forming a front-mirror element, said materials having substantially matching indices of refraction, said gain and Q-switch materials having respective inner ends with Brewster-angled surfaces separated by a first air gap, and said Q-switch and end mirror materials having, respectively, an outer end and an inner side with Brewster-angled surfaces separated by a second air gap, said first and second gaps having lengths in total not exceeding one-fourth of the distance between said back-mirror element and said front-mirror element, whereby said cavity minimizes astigmatism.

11. A laser cavity as recited in claim 10 wherein said gain material has, opposite its Brewster-angled inner end surface, a curved outer end surface with a coating forming said back-mirror element that reflects light at wavelengths resonating within the laser cavity, and said end mirror material has, opposite its Brewster-angled inner side surface, a flat outer side surface with said partially-transmissive coating.

12. A laser cavity as recited in claim 10 wherein said gain material has, opposite its Brewster-angled inner end surface, a flat outer end surface with a coating forming said back-mirror element that reflects light at wavelengths resonating within the laser cavity, and said end mirror material has, opposite its Brewster-angled inner side surface, a curved outer side surface with said partially-transmissive coating.

13. A laser cavity as recited in claim 10 wherein said gain material has, opposite its Brewster-angled inner end surface, a curved outer end surface with a coating forming said back-mirror element that reflects light at wavelengths resonating within the laser cavity, and said end mirror material has, opposite its Brewster-angled inner side surface, a curved outer side surface with said partially-transmissive coating.

14. A laser cavity as recited in claim 10 wherein said gain material has, opposite its Brewster-angled inner end surface, a flat outer end surface with a coating forming said back-mirror element that reflects light at wavelengths resonating within the laser cavity, and said end mirror material has, opposite its Brewster-angled inner side surface, a flat outer side surface with said partially-transmissive coating, and forms a resonant cavity by thermal lensing.

15. A laser cavity as recited in claim 10 wherein said Brewster angles are equal to within a tolerance of 0.6 degrees.

16. A laser cavity as recited in claim 10 wherein said laser gain material comprises Nd:YLF and said Q-switch and end mirror materials comprise fused silica.

17. A laser cavity as recited in claim 10 wherein said laser gain material comprises Nd:YAG and said Q-switch and end mirror materials comprise SF10 glass.

18. A laser cavity as recited in claim 10 and further comprising a mounting structure with solder mountings for supporting said gain material and said end mirror material.

19. A laser cavity as recited in claim 18 and further comprising a heat sink coupled to said gain material.

* * * * *